April 3, 1951 H. E. MICHAEL 2,547,226
MEANS OF ATTACHING WING TIP FUEL TANKS TO AIRPLANES
Filed July 3, 1948 3 Sheets-Sheet 1

INVENTOR.
HAROLD E. MICHAEL
BY
Herbert E. Metcalf
Attorney

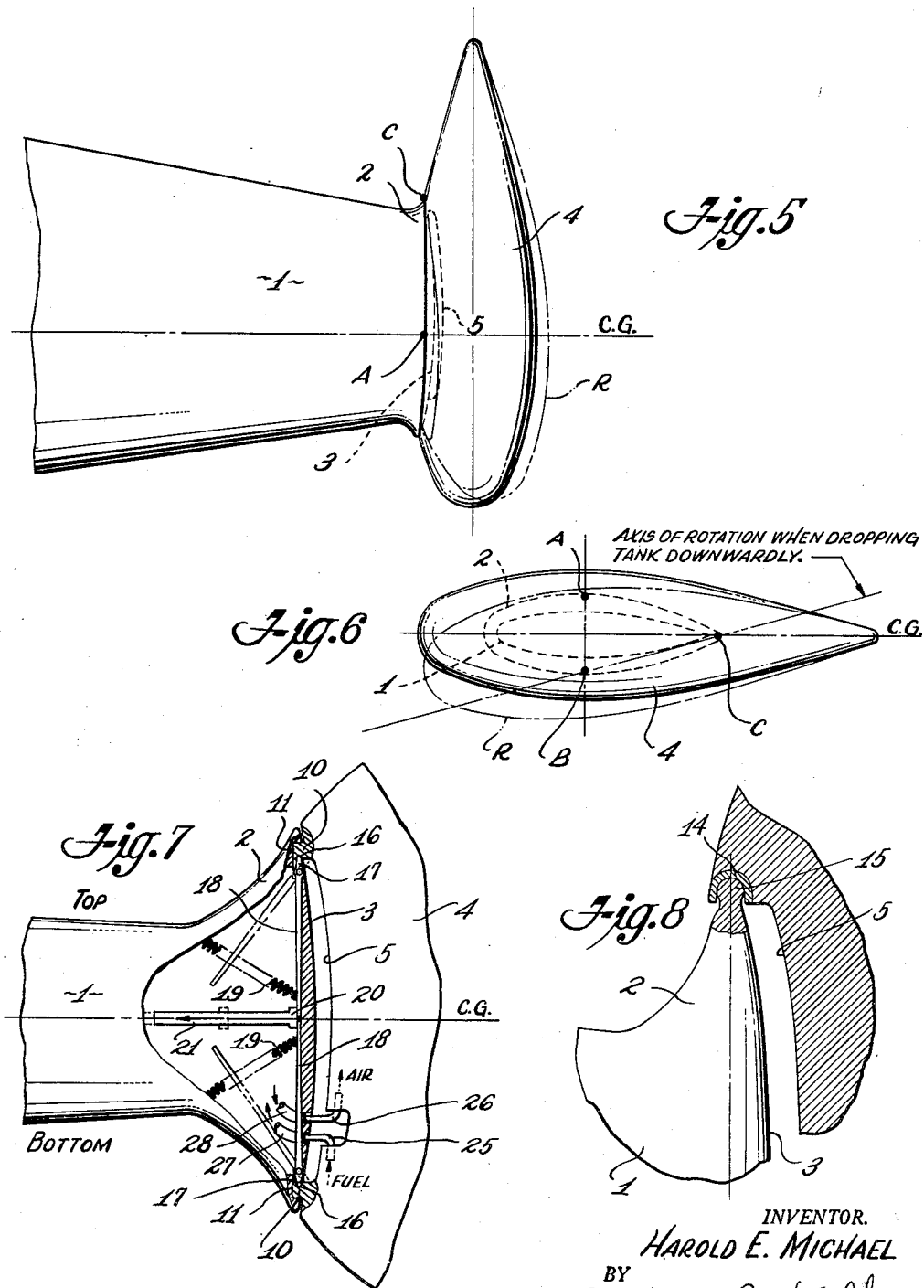

April 3, 1951        H. E. MICHAEL        2,547,226
MEANS OF ATTACHING WING TIP FUEL TANKS TO AIRPLANES
Filed July 3, 1948        3 Sheets-Sheet 3
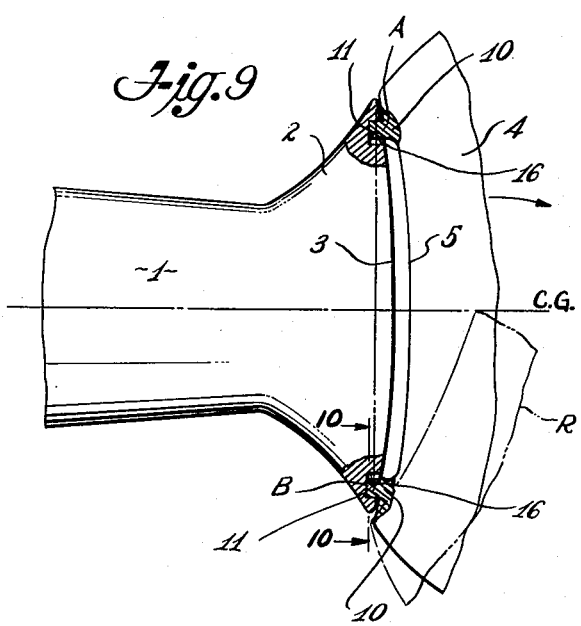
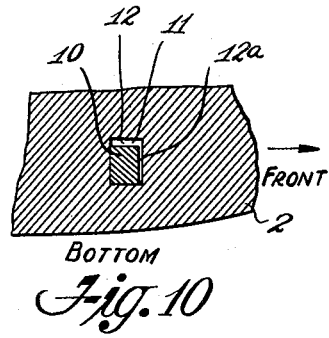
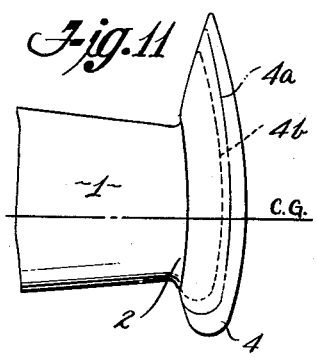
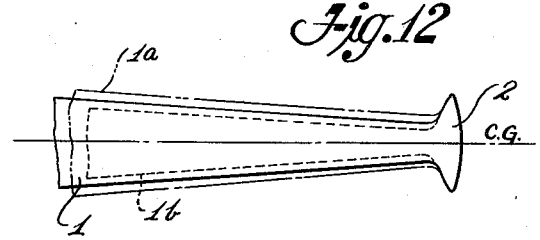
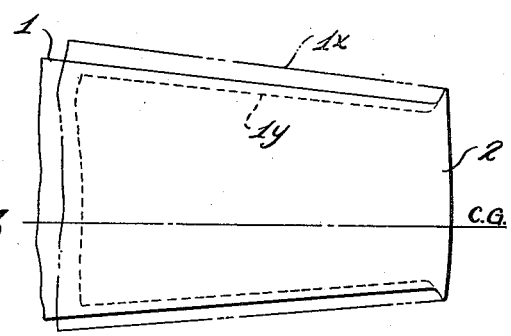
INVENTOR.
HAROLD E. MICHAEL
BY
Herbert E. Metcalf
Attorney Patented Apr. 3, 1951

2,547,226

UNITED STATES PATENT OFFICE 2,547,226

MEANS OF ATTACHING WING TIP FUEL TANKS TO AIRPLANES

Harold E. Michael, Glendale, Calif., assignor to Northrop Aircraft, Inc., Hawthorne, Calif., a corporation of California Application July 3, 1948, Serial No. 37,014

12 Claims. (Cl. 244—135)

1

The present invention relates to wing tip fuel tanks for airplanes, and more particularly to jettisonable wing tip fuel tanks designed to separate readily from the aircraft in flight after release by the airplane crew.

Modern high speed airplane design has introduced facts greatly reducing space formerly available for fuel storage. Wing sections have been greatly thinned, and fuselage space has been taken up by the installation of jet engines and, in military airplanes by complicated radio and radar equipment. Furthermore, jet engines of the gaseous combustion turbine type have a relatively high specific fuel combustion rate. These two factors alone have combined to greatly reduce the range of high speed airplanes powered by jet engines when the entire supply of fuel is carried wholly within the airplane.

In consequence, resort has been had to the use of jettisonable fuel tanks, the fuel from which is used up first during flight and when empty, the tank is separated from the airplane in flight and dropped. These separable tanks were, at first, carried beneath the wing near the tip thereof, but as the aerodynamic characteristics of tanks positioned beneath the wing are not too satisfactory, the tanks have been, in a number of instances, moved to the wing tip, being symmetrically positioned thereon. Aerodynamically the wing tip position is preferable, as the tank provides some end plate effect.

Originally such wing tanks were only used to carry 100 to 200 gallons of fuel. The demand for still more fuel, particularly in military pursuit planes, however, has led to an increase in size of such auxiliary fuel tanks until at present wing tip tanks holding 625 gallons of fuel, for example, are being utilized, weighing more than 2 tons when filled.

Such tanks, when mounted on the wing tips of an airplane, must be cantilevered to the end of the wing, and must be coupled to the wing through fittings insuring that the tanks be accurately mounted with respect to the wing tip and to the airplane center of gravity.

These tanks are customarily attached to the wing tips of the airplane with the attachment plane tangential to the round tank section. The wing section at the tip is thin and in consequence, for up-and-down loads, which are large, the tanks must be attached to the wing tip by fittings that have extremely short moment arms. These fittings are usually two wedge type fittings, one fore and one aft of the tank and wing C. G. line i. e. widely spaced in only one dimension, and these fittings must be extremely heavy and accurately machined to withstand the large bending moments imposed upon them.

The short moment arms of the fittings holding conventional heavy tanks on the airplane wing

2 tips causes high friction coefficients at the fitting joint. The jettisoning of a heavy wing tip fuel tank is at best an uncertain and delicate operation, as it is imperative that the tank be releasable to clear the airplane either when full or empty at any speed and attitude of the airplane. With extremely large tanks the frictional forces on the fittings have in many instances been so high that positive force has to be exerted on the tank to insure a clean separation of the tank and airplane. This force can be applied by a hydraulic plunger or as has been used in some instances, by a controlled explosive the force of which is directed to blow the tanks off.

It is an object of the present invention to provide a means and method of mounting a heavy detachable fuel tank on an airplane wing tip in such a manner as to provide relatively long moment arms, with consequent low friction forces at the attachment joint.

It is another object of the invention to provide a means and method of mounting a jettisonable wing tip fuel tank on an airplane to insure a clean separation of tank and airplane when the tank is released, without the application of power from the airplane.

In broad terms, the present invention includes the use of a small end plate on the airplane wing tip, this end plate being of sufficient extent horizontally and vertically to provide two vertically spaced attachment points and a horizontal stabilizing point whereby, when released the tank must assume an angular position where the airstream provides a positive separation force insuring a quick breakaway of the tank.

When such an end plate is utilized, the outer surface of the end plate can also be utilized as a mounting surface that can accommodate tanks of different sizes, and the same size end plate can be used on a number of different airplanes.

It is still another object of the present invention to provide a means and method of interchangeably mounting tanks of different sizes on the same wing tip end plates, this size of end plate being suitable for use on a number of airplanes of different sizes.

The ideal wing tip fuel tank and fitting should meet the following requirements:

A. The tank attachments should have sufficiently long moment arms to keep their size and weight to a minimum.

B. The act of jettisoning the tank should require only the release of the fastening device to provide a clean breakaway.

C. The attachments should place the tank center of gravity on the airplane C. G. for a number of tank sizes, and be adaptable to a number of airplane sizes.

D. The attachment should present a minimum of drag with the tanks removed.

It is still another object of the present invention to provide a means and method of joining an auxiliary fuel tank to a wing tip that will meet all of the above requirements.

The invention may be more fully understood by reference to the drawings in which:

Figure 5 is a diagrammatic top plan view of the wing tip and tank of Figure 4.

Figure 6 is a diagrammatic end view of the wing tip and tank of Figure 4.

Figure 7 is a diagram showing one form of attachment lock.

Figure 8 is a diagram showing one form of tank stabilizing connection.

Figure 9 is a diagram showing tank and tank fitting behavior at points A and B after tank release.

Figure 10 is a sectional view taken as indicated by line 10—10 in Figure 9.

Figure 11 is a diagram showing how tanks of varying sizes can be fitted to the same end plate.

Figure 12 is a diagrammatic front view of an end plate showing attachment to airplanes of varying wing tip thicknesses.

Figure 13 is a diagrammatic top plan view of the end plate of Figure 3 showing attachment thereof to airplanes having different chord lengths.

Figure 1:
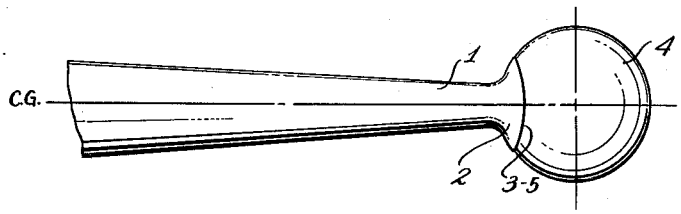
Figure 1 is a diagrammatic front view of an airplane wing tip showing the use of the present invention.
Figure 2:
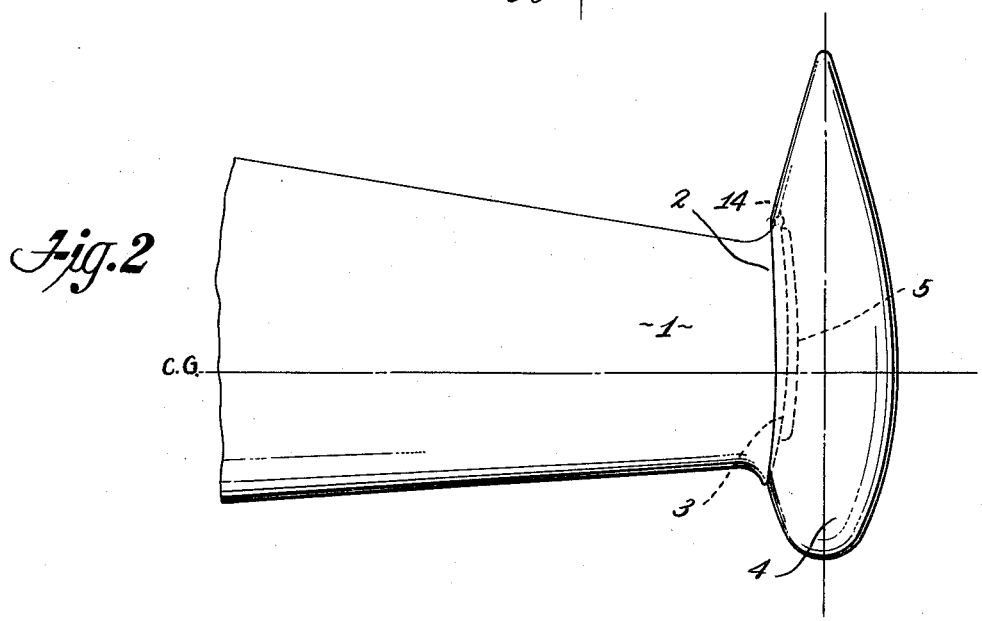
Figure 2 is a diagrammatic top plan view of the wing tip and tank shown in Figure 1.
Figure 3:
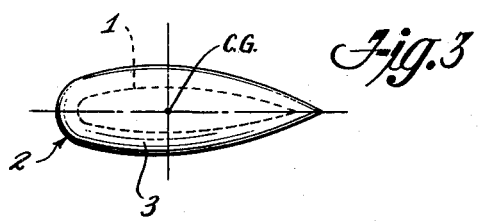
Figure 3 is a diagrammatic end view of the end plate as used on the wing tip.

Referring first to Figures 1, 2 and 3, an airplane wing tip 1 is provided with an end plate 2 faired into the wing section and having a flat or preferably somewhat convex outer surface 3. A wing tip tank 4 of streamline shape and of generally round section is provided with a preferably somewhat concave tank surface 5 spaced from but preferably of the same general contour as surface 3.

The surface 5 is positioned on tank 4 so that when the tank is attached to the end plate 2 with surfaces 3 and 5 in opposition, the C. G. of the tank will lie in the lateral C. G. line of the airplane passing through the wing, as indicated in these figures, so that the longitudinal balance of the airplane will not be affected by the addition of the tanks.

Figure 4:
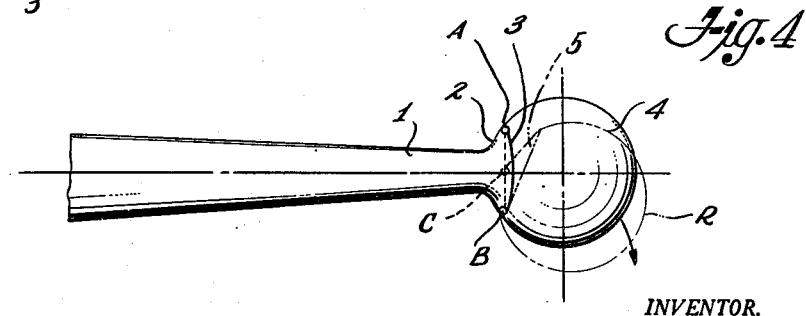
Figure 4 is a diagrammatic front view of a wing tip and tank showing tank attachment points.

With these cooperating surfaces opposed, particular means are utilized to insure clean separation of tank and airplane, and for this purpose a three point tank-tip connection is preferred, these points being shown labelled A, B, and C, as shown in Figures 4, 5 and 6.

Here points A and B are positioned at or near the upper and lower edges, respectively, of the tip and tank opposed surfaces 3 and 5 respectively, a vertical line connecting these points A and B preferably passing through the center of gravity line C. G. of wing and tank. These points A and B are the main attachments and locking points between tank and wing tip.

Point C, the third point, is at the rear of the opposed surfaces, and is a stabilizing point only, provision being made for tank rotation on the wing tip at point C with, however, no locking taking place there.

Referring next to Figures 7 to 10 inclusive for the general contour of the fittings at points A, B and C, the tank at both points A and B is provided with an attachment lug 10 of rectangular section, each fitting into attachment recesses 11 at points A and B in the outer end plate surface. Tank lugs 10 fit their tip recesses closely except for their inner surfaces 12 and 12a between which and the adjacent recess wall a sufficient play is left (Figure 10) to permit the lugs to rotate out of the recesses when the tank is rotated outwardly and downwardly as shown by broken line R in Figures 4, 5, 6 and 9, or is rotated upwardly. The tank, however, is restrained from fore-and-aft relative motion and from upward or downward relative motion by the relatively close fit of all other lug recess surfaces. Of course, a straight outward motion of the lugs is also permitted by these fits.

The attachment at point C is purely a stabilizing attachment, and is shown in Figure 8. At point C, a ball receiving recess 14 is provided at the rear end of tank surface 5, this recess opening forwardly. Projecting rearwardly from the rear of end plate 2 is a lug ball 15 entering recess 14. This stabilizing connection prevents up-and-down, forward and sideways motion of the tank, but does provide for free tank movement aft, and for rotation of the tank on ball 15 when lugs 10 are unlocked or out of their recesses 11.

One means of locking lugs 10 in recesses 11 at points A and B is shown schematically in Figure 7. Here the inner surface 12 of each lug is provided with a lock notch 16 into which is fitted a trigger 17 forming the short end of a locking lever 18. The long ends of each lever 18 extend toward each other when the triggers 17 are in the lock notches 16 and are held in this position against springs 19 by a release block 20 mounted on the end of an operating rod 21 that can be retracted by the pilot of the airplane to free levers 18 so that lugs 10 can move outwardly in recesses, thereby releasing the tank.

A conventional fuel conection is also shown in Figure 7, where a tank fuel tube 25 and a tank air tube 26 are extended to enter rubber fuel tube 27 and rubber air tube 28 respectively at the end plate surface. The air is used to pressurize the tank to force fuel into the airplane and the tank tubes are pulled out of the rubber tubes as the tank moves away from the end plate. Other arrangements, such as breakable tubes, are equally satisfactory.

The action of the locking points at A and B and the stabilizing point at C insures clean clearance of the tank when lugs 10 are unlocked. When these lugs 10 are freed, only the nose of the tank is free to move outwardly, because as long as lugs 10 are in recesses 11 the tank must rotate on ball 15 in ball recess 14. Any slight side force on the tank will, however, move the nose of the tank outwardly, thereby placing the tank at an angle to the airstream where a strong air flow force is developed on the inboard tank surface to move the nose of the tank still further away from the end plate, the tank tail being still restrained. When the lugs 10 have cleared recesses 11, the drag of the tank slows the tank with respect to the airplane so that ball 15 leaves its recess. At this time the tank, due to its nose-out angular relation to the airstream has a strong outward motion component carrying it well away from the end plate with its nose heading outwardly, thus precluding fouling of the end plate as the end plate passes the tank. The net result of the first release of the nose, with subsequent release of the tail, is that the tank is projected well away from the airplane.

The initial rotation of the tank with a radius centered in ball 15 may be around axis A—C which might happen if the tank were empty. Or, when the tank has fuel in it, rotation may be around axis B—C as shown in Figures 4, 5, 6 and 9. It is also possible that a straight lateral rotation might take place moving both lugs 10 simultaneously out of recesses 11. In any case, the initial rotation is centered on ball 15 to cause the desired nose-out position to develop the separation force from the airstream.

As the radius of tank rotation on either lug 10 is relatively short, clearance sufficient for lug 10 rotation on this shorter radius between the inner facing surfaces 12 and their respective recess walls is provided. As the tank can also rotate on the longer radius AB—C when both lugs at A and B move outwardly simultaneously, a small clearance between the front surfaces 12a of the lugs 10 and the recess walls is also desirable. However, these clearances do not disturb the accurate positioning of the tank, as up-and-down movement of the tank on the end plate is prevented by the fit of the upper surface of the upper lug with its recess wall at A, and fit of the lower surface of the lower lug with its recess wall at B, taken together with the fit of ball 15 in recess 14 at point C.

Forward movement of the tank on end plate 2 is prevented by the fit of ball 15 in recess 14, and aft movement is prevented by the fit of the rear surfaces of the lugs 10 in their recesses at both points A and B. Thus the tank is fully stabilized when attached, but is free to rotate as above described when the lugs are unlocked, in all cases in a direction moving the tank nose outwardly.

The various rotating actions above described require a substantial spacing of points A, B and C, and thus is ideally adapted for use in conjunction with the end plate 2 which provides for, and fairs the spaced attachment points.

It will thus be noted that the present invention requires the use of a permanent enlargement on the airplane wing tip i. e. a small end plate. Factual data on the exact effect of small end plates on airplane wings are difficult to obtain, but such data as are at present available indicate that end plates, if not too large, are in general beneficial, or at most do not adversely affect airplane performance to a substantial degree.

In addition to the fact that spaced three point support of the tank permits rotation of the tank to obtain the desired nose-out position where the air-stream operates to separate tank and wing tip end plate, the relatively wide spacing of points A, B and C permits the fittings at these points to be reduced in weight, because of the greater moment arms available. The reduction of the moments carried through the attachment fittings also reduces the friction at points A and B and this again facilitates a clean breakaway of the tank.

It should also be noted that the means and method of attachment of jettisonable wing tip tanks to an airplane wing tip in accordance with the present invention does not increase the drag of the tank fitted airplane substantially over that obtained in airplanes equipped with conventional tanks having a round section, at the attachment plane, instead of being tangential to the tank surface as in conventional tanks, in effect intersects the projected round section of the tank, with the projected part forming the end plate on the wing tip (see Figure 1). This permits fairing the intersection plane into the wing tip thereby forming the end plate, such fairing not being practical when the attachment plane is tangential to the round tank section. While the tank must be slightly larger to accommodate the same amount of fuel as a tank of complete round section, the good aerodynamic characteristics of the faired end plate and attached tank substantially compensates for the slightly increased size. The result of all these factors makes the aerodynamic performance of airplanes carrying conventional tanks, and airplanes carrying the tanks and attachment of the present invention substantially directly comparable.

Another advantage of utilizing an end plate larger in both vertical and horizontal planes than the wing section at the tip of the wing, is that for a number of tank sizes the tank surface 5 can be of the same dimensions and curvature, as shown in Figure 11 where smaller tanks 4a and 4b are shown as being attachable to the same end plate 2. Similarly the same size wing tip surface 3 can be utilized on airplanes of different wing tip thicknesses as shown by wing tip lines 1a and 1b in Figure 12; and on airplanes having different tip chord lengths as shown by lines 1X and 1Y in Figure 13. Thus the same size wing tip surface 3 and fittings can be used on a number of different airplanes, and the same size tank surface 5 and fittings can be used on a number of different capacity tanks. This feature obviates the necessity of tailoring each tank to a particular airplane, provides complete interchangeability of tanks, and thus for military airplanes at least, greatly simplifies the logistic problems involved in supplying jettisonable tanks to an outlying operational airplane group.

It will also be noted that after the tank breakaway, there are no projections on the end plate surface 3 to create drag. Only the lug recesses 11 and the ends of rubber tubes 27 and 28 break the continuity of this surface. Lug ball 15 projects rearwardly, and in effect forms the rear termination of end plate 2. Thus, after separation, the end plate is exceptionally clean aerodynamically.

Although only one embodiment of the present invention has been described in detail, it is to be expressly understood that the invention is not limited thereto. For example, any convenient means of locking lugs 10 in recesses may be utilized with lugs of various cross sections. Thus, various changes can be made in the design and arrangement of the parts without departing from the spirit and scope of the invention as the same will now be understood in the art. For a definition of the limits of the invention, reference will be had primarily to the appended claims.

What is claimed is:

1. In an airplane, an end plate on each tip of the wing of said airplane, said end plate having an outer end plate surface of substantial vertical and horizontal extent, a wing tip fuel tank having a tank surface opposed to and spaced from said end plate surface, a pair of tank attachment fittings positioned vertically adjacent the edges of said opposed surfaces at the maximum vertical dimension thereof and detachably joining said surfaces, and a tank stabilizing connection between said mating surfaces at the rear of said surfaces.

2. Apparatus in accordance with claim 1 wherein said end plate surface is faired into said wing tip.

3. Apparatus in accordance with claim 1 wherein said end plate surface is convex and wherein said tank surface is concave.

4. Apparatus in accordance with claim 1 wherein said tank attachment fittings are vertically positioned so that a line joining these attachments passes through the laterally projected C. G. line of said airplane.

5. Apparatus in accordance with claim 1 wherein said tank attachment fittings are vertically positioned so that a line joining these attachments passes through the laterally projected C. G. line of said airplane and wherein the C. G. of said tank is located in said line.

6. Apparatus in accordance with claim 1 wherein said tank attachment fittings are vertically positioned so that a line joining these attachments passes through the laterally projected C. G. line of said airplane and wherein the longitudinal axis of said tank passes through said C. G. line and said attachment fittings and said stabilizing connection define a plane located inboard of and parallel to the longitudinal axis of said wing tip tank.

7. Apparatus in accordance with claim 1 wherein means are provided to lock said tank to said end plate at said tank attachment fittings only.

8. In an airplane, an end plate on each end of the wing of said airplane and having an outer convex surface end plate surface at least as long as the chord of said wing tip and substantially wider than the thickness of said wing tip, a wing tip tank having a concave tank surface mating with said end plate surface, a pair of attachment lug recesses in said end plate surface spaced above and below the lateral C. G. line of said airplane and positioned adjacent the edges of said end plate surface at the greatest width thereof, a stabilizing recess in said tank surface adjacent the rear edge of said end plate, and opening forwardly, a pair of attachment lugs projecting outwardly from said tank surface each positioned to enter n attachment recess, a stabilizing lug extending rearwardly from said end plate surface and positioned to enter said stabilizing recess, and means for locking and unlocking said attachment lugs in said attachment recesses.

9. Apparatus in accordance with claim 8 wherein said attachment lugs and recesses are of square section with vertical and horizontal side walls and wherein said lugs fit said recesses closely except for the recess surfaces facing inwardly and forwardly.

10. Apparatus in accordance with claim 8 wherein said attachment lugs and recesses are of square section with vertical and horizontal side walls and wherein said lugs fit said recesses closely except for the recess surfaces facing inwardly, which latter surfaces are spaced from their facing lug walls by an amount permitting outward rotation of said lugs in said recesses.

11. Apparatus in accordance with claim 8 wherein said attachment lugs and recesses are of square section with vertical and horizontal side walls and wherein said lugs fit said recesses closely except for the recess surfaces facing inwardly and forwardly, which latter surfaces are spaced from their facing lug walls by an amount permitting outward rotation of said lugs in said recesses and wherein the end of said stabilizing lug is semi-spherical to permit rotation of said stabilizing lug in its recess.

12. Apparatus in accordance with claim 1 wherein each of said attachment fittings comprises a lug on said tank, a recess in a lug receiving member attached to said end plate, said recesses located to fixedly confine said lugs against appreciable fore-and-aft movement therein, the vertical dimension from the top of the upper lug to the bottom of the lower lug being substantially equal to the vertical dimension from the top of the upper recess to the bottom of the lower recess, to prevent relative vertical play between said tank and said end plate, the upper tank attachment fitting having a clearance space beneath said upper lug in said upper recess to allow upward and outward rotation of said tank about said upper lug, and the lower tank attachment fitting having a clearance space above said lower lug in said lower recess to allow downward and outward rotation of said tank about said lower lug, and wherein said tank stabilizing connection comprises a generally semi-spherical, forwardly opening socket fixed on said tank and a rearwardly projecting ball-like member fixed on said end plate and positioned to engage in said socket, whereby rotation of said tank about said stabilizing connection is allowed when either or both of said lugs are freed from their respective recesses, and whereby said stabilizing connection remains so rotatably engaged until both of said lugs are separated from said recesses.

HAROLD E. MICHAEL.

REFERENCES CITED

The following references are of record in the file of this patent:

UNITED STATES PATENTS

| Number | Name | Date |
|---|---|---|
| 2,346,977 | La Sha | Apr. 18, 1944 |
| 2,416,104 | Lerche | Feb. 18, 1947 |